United States Patent
Gafford

(10) Patent No.: US 10,592,287 B2
(45) Date of Patent: Mar. 17, 2020

(54) API AND USER INTERFACE FOR MAPREDUCE JOBS

(71) Applicant: RED HAT, INC., Raleigh, NC (US)

(72) Inventor: Ethan Gafford, Boston, MA (US)

(73) Assignee: Red Hat, Inc., Raleigh, NC (US)

( * ) Notice: Subject to any disclaimer, the term of this patent is extended or adjusted under 35 U.S.C. 154(b) by 57 days.

(21) Appl. No.: 14/947,135

(22) Filed: Nov. 20, 2015

(65) Prior Publication Data

US 2017/0147401 A1 May 25, 2017

(51) Int. Cl.
G06F 9/50 (2006.01)
G06F 3/0482 (2013.01)
G06Q 10/00 (2012.01)

(52) U.S. Cl.
CPC .......... G06F 9/5005 (2013.01); G06F 3/0482 (2013.01); G06F 9/5066 (2013.01); G06Q 10/00 (2013.01)

(58) Field of Classification Search
CPC .... G06F 9/5005; G06F 3/04842; G06Q 10/00
See application file for complete search history.

(56) References Cited

U.S. PATENT DOCUMENTS

| | | | |
|---|---|---|---|
| 8,892,599 B2 | 11/2014 | Lindblad et al. | |
| 9,031,925 B2 | 5/2015 | Gardella et al. | |
| 9,092,412 B2 | 7/2015 | Salch et al. | |
| 9,122,532 B2 | 9/2015 | Kosuru et al. | |
| 9,747,333 B2* | 8/2017 | Zeyliger | G06F 17/30424 |
| 2009/0006309 A1 | 1/2009 | Hunt et al. | |
| 2012/0054625 A1* | 3/2012 | Pugh | G06F 21/41 715/736 |
| 2013/0297624 A1 | 11/2013 | Raghunathan et al. | |
| 2014/0055496 A1 | 2/2014 | Cunningham et al. | |
| 2014/0115282 A1* | 4/2014 | Natkovich | G06F 12/16 711/162 |

(Continued)

OTHER PUBLICATIONS

Dean et al. MapReduce: Simplified Data Processing on Large Clusters. [online] (2004). Google, Inc., pp. 1-13. Retrieved From the Internet <https://static.googleusercontent.com/media/research.google.com/en//pubs/archive/33004.pdf>.*

(Continued)

*Primary Examiner* — Emerson C Puente
*Assistant Examiner* — Jonathan R Labud
(74) *Attorney, Agent, or Firm* — Lowenstein Sandler LLP

(57) ABSTRACT

Implementations for a user interface for MapReduce job are disclosed. A method of the disclosure includes receiving a request to submit a MapReduce job to a cluster and providing a first graphical user interface (GUI) to input a first set of arguments and first argument values for a first portion of the arguments. The method may include receiving, from the first GUI, the first argument values and a second portion of the arguments, associated with a configuration of the cluster and without a corresponding argument value.

The method may provide a second GUI that is to display the arguments, first argument values, and allow for a selection of second argument values for the second portion of the arguments. In response to a selection, the method may execute the MapReduce job in view of the first argument values from the first GUI and the second argument values from the second GUI.

19 Claims, 5 Drawing Sheets

(56) References Cited

U.S. PATENT DOCUMENTS

| | | | | |
|---|---|---|---|---|
| 2015/0074151 A1* | 3/2015 | Chaiken | ............ | G06F 17/30569 707/803 |
| 2016/0342606 A1* | 11/2016 | Le Mouel | ........... | H04L 67/2828 |
| 2017/0017354 A1* | 1/2017 | Wei | ....................... | G06F 3/0482 |

OTHER PUBLICATIONS

Babu et al. Towards Automatic Optimization of MapReduce Programs. [online] (2010). ACM., pp. 1-6. Retrieved From the Internet <https://users.cs.duke.edu/~shivnath/papers/socc2010.pdf>.*

Sauer. XQuery Processing in the MapReduce Framework. [online] (2012), pp. 1-95. Retrieved From the Internet <file:///C:/Users/jlabud/Documents/e-Red%20Folder/14947135/XQuery%20Processing%20in%20the%20MapReduce%20Framework.pdf> (Year: 2012).*

Orekhov, Dmitry, Complex Data Processing Gets Simpler With Cascading, 5 pages, http://www.epam.com/ideas/blog/complex-data-processing-gets-simpler-with-cascading.

Building a Map-Reduce Facility, 15-640/440 Project #3, Fall 2014, Kesden, 6 pages, https://www.google.com/url?sa=t&rct=j&q=&esrc=s&source=web&cd=1&cad=rja&uact=8&ved=0CB0QFjAAahUKEwjOlfHeufbHAhVEbY4KHVc5Aro&url=http%3A%2F%2Fwww.andrew.cmu.edu%2Fcourse%2F%2F15-440-f14%2Fapplications%2Flabs%2Flab3%2Fproject3.docx&usg=AFQjCNGRFflqxLflDTpWSoq26wwsZDZMwA&bvm=bv.102537793,d.c2E.

White, Tom, 10 MapReduce Tips, Cloudera Engineering Blog, May 19, 2009, 4 pages, http://blog.cloudera.com/blog/2009/05/10-mapreduce-tips/.

Hadoop I/O, Hadoop:The Definitive Guide, 3rd Edition, Chapter 4, 37 pages, https://www.safaribooksonline.com/library/view/hadoop-the-definitive/9781449328917/ch04.html.

Laserson, Uri, A Guide to Python Frameworks for Hadoop, Cloudsera Engineering Blog, Jan. 7, 2013, 10 pages, http://blog.cloudera.com/blog/2013/01/a-guide-to-python-frameworks-for-hadoop/.

* cited by examiner

API AND USER INTERFACE FOR MAPREDUCE JOBS

TECHNICAL FIELD

The implementations of the disclosure relate generally to computing infrastructures and, more specifically, relate to an application programming interface (API) and user interface for MapReduce jobs.

BACKGROUND

Modern data centers often include a large number of hosts, or nodes, that may operate on a large amount of data. Because this data is often spread out across a large number of nodes, indexing and searching operations can be difficult to perform in an effective manner. MapReduce functions are one way to process this large amount of data that is spread across a large number of nodes. MapReduce functions may include two phases. The first phase (e.g., the "mapping" phase) performs filtering and sorting operations on the data. The second phase (e.g., the "reduce" phase) performs consolidation operations on the filtered data.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Figure 1:
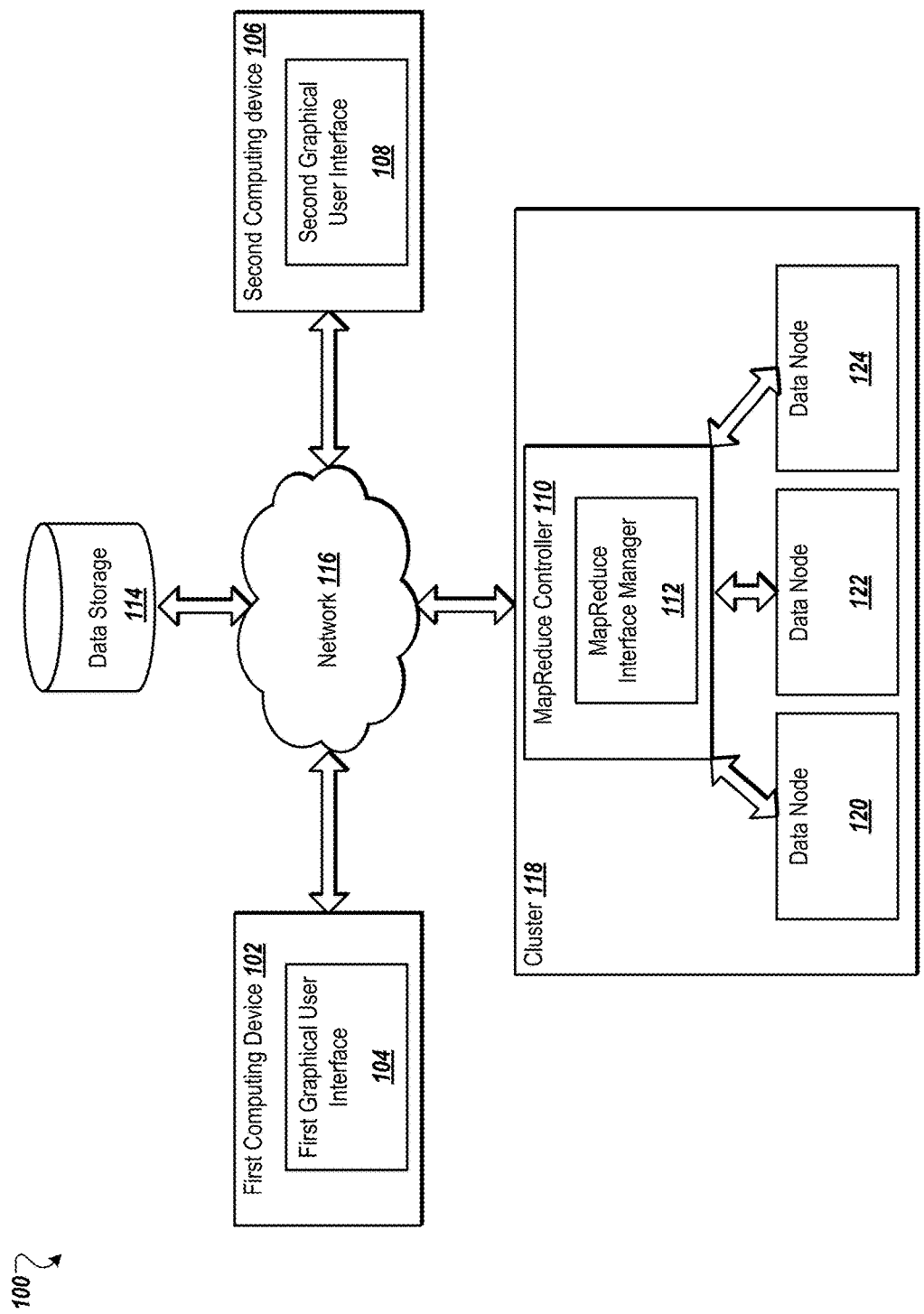
FIG. 1 is a block diagram of a network architecture in which implementations of the disclosure may operate.

MapReduce is a framework for processing, in parallel, large datasets using a large number of host systems or nodes which may collectively be referred to as a cluster. A job developer may program and/or submit a MapReduce Job to be executed on the cluster. The job developer may additionally submit arguments and argument values that correspond with the MapReduce job to be executed. For example, a MapReduce job may be written in such a way that the execution of the job may utilize arguments with corresponding argument values. Once the job developer has submitted a MapReduce job to the cluster for execution, a cluster operator may initiate the execution of the job. A cluster operator may administer and/or manage the cluster on which the submitted MapReduce job is executed.

In order to create and execute a successful MapReduce job, extensive knowledge of the configuration of a cluster may be needed. For example, knowledge of a type of engine and/or hardware of the cluster being used to execute the job may be needed. While a cluster operator may have such knowledge, many job developers do not have such detailed knowledge of the configuration of the cluster. Additionally, extensive knowledge of the specific MapReduce job being run may be required. However, the cluster operator may not have the detailed knowledge of the programming of the MapReduce job. Thus, in order to successfully execute a MapReduce job, an individual may need to have knowledge of both the configuration of the cluster and the specifics of the programming of the MapReduce job.

The present disclosure addresses the above and other deficiencies by splitting the specification of arguments and argument values for the MapReduce job between the job developer and the cluster operator. For example, the job developer may specify arguments that are used for the MapReduce job and may provide argument values for a first portion of the arguments. The cluster operator may specify argument values for a second portion of the arguments for the MapReduce job before executing it. This divides the specification for the MapReduce job based on the cluster operator's knowledge of the cluster that executes the MapReduce job and the job developer's knowledge of the MapReduce job. The present disclosure thus provides better encapsulation of roles, communication between the job developer and the cluster operator, and improves efficiency of cluster administration.

In one embodiment of the present disclosure, a first graphical user interface (GUI) may be provided to the job developer. It should be noted that the use of the term graphical user interface (GUI) throughout this disclosure may also refer to the MapReduce API framework that structures the GUIs disclosed herein. The MapReduce API is discussed in detail with respect GUI 300 of FIG. 3. The first GUI may be provided in response to a request to initiate or submit a MapReduce job to the cluster. Furthermore, the first GUI may allow for a selection of first argument values that correspond to a portion of the arguments that are to be used for the execution of the MapReduce job. Alternatively, argument values may be submitted via API. For example, the job developer may specify the arguments that are used in a MapReduce job and may provide first argument values for a first portion of the arguments. In some embodiments, the first portion of the arguments may correspond to arguments for the MapReduce job that are known to the job developer (e.g., arguments associated with the processing of data). Examples of such arguments include, but are not limited to, how the MapReduce job is to sort and filter the data and the main class from which the job begins running. The first GUI may also be used by the job developer to indicate specific arguments that a cluster operator will need to provide values for before execution of the MapReduce job. For example, the job developer may indicate a second portion of the arguments where the cluster operator is to provide second argument values for the second portion of the arguments before the execution of the MapReduce job. Such other arguments may correspond to a configuration of the cluster. Examples of such arguments include, but are not limited to, an input data source for the MapReduce job (e.g., the location of the data to be used), output data source (e.g., the location where the results of the MapReduce job are to be stored), and the number of slots (e.g., nodes) that should be allocated to each phase (e.g., map phase and reduce phase). Thus, the job developer may submit the job to an execution queue of the cluster with an indication that argument values for arguments that correspond to the configuration of the cluster should be provided by the cluster operator.

A second GUI may be provided to the cluster operator before the execution of the MapReduce job. The second GUI may display the arguments that were input into the first GUI by the job developer, the first argument values for the first portion of the arguments, and allows the cluster operator to select second argument values for the second portion of the arguments. For example, the second GUI that is provided to the cluster operator shows the arguments used for the MapReduce job and corresponding argument values to the cluster operator. The cluster operator may then fill in any voids in argument values (e.g., for arguments that correspond to a configuration of the cluster) with an appropriate argument value.

After the cluster operator provides the remaining argument values, the cluster operator may cause the second GUI to execute the MapReduce job associated with the job identifier by using the first argument values from the first GUI that are provided by the job developer and the second argument values from the second GUI that are provided by the cluster operator.

FIG. 1 is a block diagram of a network architecture 100 in which implementations of the disclosure may operate. The network architecture 100 includes first computing device 102, second computing device 106 and a third computing device (e.g., MapReduce controller 110), all accessible over network 116. MapReduce controller 110 may be a part of a cluster 118. Cluster 118 may include one or more data nodes 120, 122, 124, with associated data stores to store MapReduce arguments and argument values as well as data that is subject to a MapReduce job. The computing devices 102, 106, 110 may communicate with each other via at least a portion of the network 116 or via a separate network.

The network 116 may be a local area network (LAN), and may be part of an equipment automation layer that may additionally include routers, gateways, servers, data stores, and so on. Computing devices 102, 106, 110 may connect to network 116 via a SEMI Equipment Communications Standard/Generic Equipment Model (SECS/GEM) interface, via an Ethernet interface, and/or via other interfaces. In one embodiment, network 116 allows information from computing devices 102, 106, 110 to be stored in data storage 114.

Although FIG. 1 illustrates three computing devices 102, 106, 110, it is to be appreciated that the network architecture 100 may include any number of computing devices 102, 106, 110. The computing devices 102, 106, 110 may be located at one or more sites, each site being remote from the other site (e.g., in different geographical locations, such as different cities or states). In one embodiment, all of the computing devices 102, 106, 110 are located at a single site. In another embodiment, at least two of the computing devices 102, 106, 110 are located at a single site and at least one other of the computing devices 102, 106, 110 is located at a different site. In another embodiment, each computing devices 102, 106, 110 is located at a different site. Each computing device 102, 106, 110 may receive instructions to perform tasks from the various computing devices 102, 106, 110.

The first computing device 102 may include a first graphical user interface (GUI) 104. The first GUI 104 may be displayed to a job developer seeking to execute a MapReduce job and may be used by the job developer to provide arguments for the MapReduce job, argument values for a first portion of the arguments, and an indication of particular arguments (e.g., a second portion) for which a cluster operator of the cluster 118 is to provide argument values.

The second computing device 106 may include a second graphical user interface (GUI) 108 that may be provided to a user (e.g., cluster operator) seeking to execute a MapReduce job specified by the job developer at the first computing device 102. Second GUI 108 may receive the MapReduce job information that has been provided to the first GUI 104 via network 116.

MapReduce controller 110 may include a MapReduce interface manager 112 that may receive a MapReduce job, corresponding job ID, and associated arguments from a user (e.g., a job developer) at first GUI 104. Furthermore, MapReduce interface manager 112 may cause the first and second GUIs 104, 108 to be displayed on first and second computing devices 102, 106. MapReduce interface manager 112 may execute the MapReduce job when a user indicates a desire to execute the job at second GUI 108. MapReduce interface manager 112 executes the MapReduce job associated with the job identifier in view of the plurality of first argument values from the first GUI, the plurality of second argument values from the second GUI, and the order of the arguments. In general, MapReduce may be broken down into a "map" phase and a "reduce" phase.

Both map and reduce phases of MapReduce act on data structured in "key, value" pairs. The Map phase produces the "key" portion of the "key, value" pair by mapping data from one domain to a second. For example, in a simple MapReduce job designed to count all words in an article that are spelled with the same number of letters (the word count is the "value"), the map phase organizes all words that have the same number of letters into separate categories. These categories are the "key" portion of the pair. For example, all words that include three letters (the "value") are mapped to the "three" category (the "key"). Hence, the MapReduce job may collect all pairs with the same key and group them together on a single node, creating one group for each key.

The Reduce phase may then work in parallel on each group (i.e. category, "key"), which produces a collection of values in the same domain. For example, once letters are grouped according to their separate keys, nodes performing the "reduce" phase may then count each value associated with corresponding keys in parallel to determine a total word-count for each key.

In one embodiment, network architecture 100 includes data storage 114 connected to network 116. In other embodiments, data storage 114 may be directly connected to computing devices 102, 106, 110. Data storage 114 and/or data stores associated with data nodes 120, 122, 124 may store job interface arguments, job identifiers, argument values, and other information associated with MapReduce jobs, as described above. Optionally, job interface arguments, job identifiers, argument values, and other information associated with MapReduce jobs can all be stored in separated data stores associated with computing devices 102, 106, 110 and/or data nodes 120, 122, 124. Data storage 114 and/or data stores associated with data nodes 120, 122, 124 may include a lookup table, a relational database, a collection of flat files, or other data structure for storing information.

Data storage 114 and/or data stores associated with data nodes 120, 122, 124 may include one or more mass storage devices which can include, for example, flash memory, magnetic or optical disks, or tape drives, read-only memory (ROM), random-access memory (RAM), erasable programmable memory (e.g., EPROM and EEPROM), flash memory, or any other type of storage medium.

Figure 2:
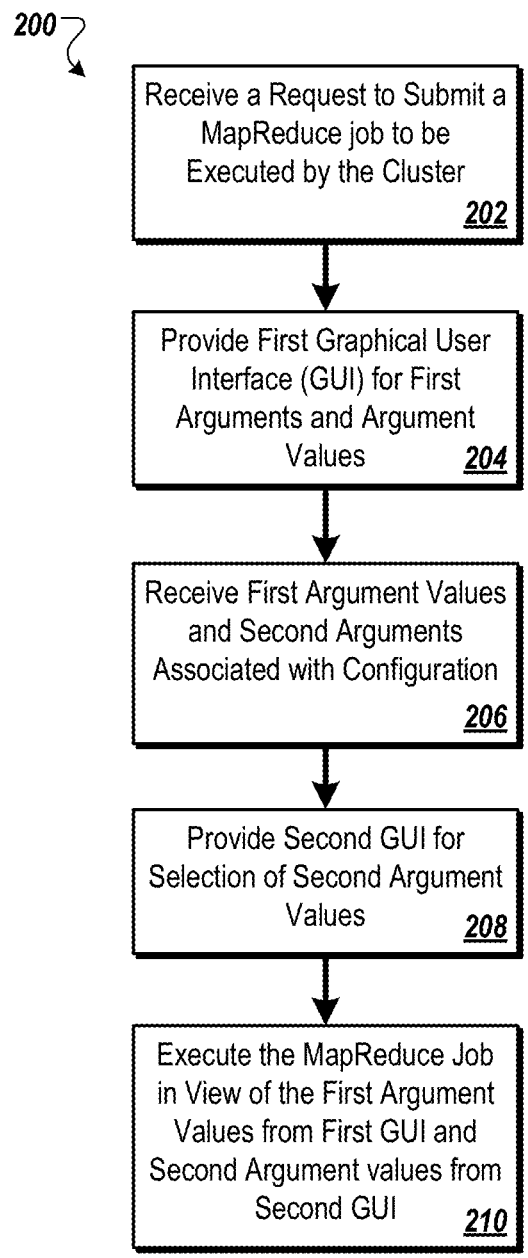
FIG. 2 is a flow diagram illustrating a method for providing GUIs to define an interface API for MapReduce jobs, according to an implementation of the disclosure.

FIG. 2 is a flow diagram illustrating a method for providing GUIs to define an interface API for MapReduce jobs. The method 200 may be performed by processing logic that includes hardware (e.g., circuitry, dedicated logic, programmable logic, microcode, etc.), software (e.g., instructions run on a processing device to perform hardware simulation), or a combination thereof. In one embodiment, MapReduce interface manager 112 executing on the MapReduce controller 110 performs method 200.

Referring to FIG. 2, at block 202, the processing logic may receive a request to submit a MapReduce job to be executed by a cluster. The processing logic may further, at block 204, provide a first graphical user interface (GUI) that allows for an input of arguments for the MapReduce job and a selection of first argument values for a first portion of the arguments. In one embodiment, the MapReduce job includes corresponding job identifier (ID) and associated arguments. In one embodiment, the arguments are of type "args," "params," and/or "configs," as described below. The job interface arguments "arg" may be defined according to the following schema:

```
"Args":
{
    "name": "Input Data Source",
    "mapping": {
        "type": "args",
        "location": "0"
    },
    ...
}
```

In one embodiment, "args" are positional arguments, passed to a MapReduce job as an array without a key. Positional arguments may be identified and parsed by the position at which they were passed into the MapReduce job. As shown with respect to the above schema, "input data source" is one example of an "arg." Input data source is passed directly to the MapReduce job to indicate the source of the data to be acted upon by the MapReduce job itself.

"Params" may be defined according the following schema:

```
{
    "name": "Output Data Source",
    "mapping: {
        "type": "params",
        "location": "OUTPUT"
    },
    ...
}
```

"Params" may be key-mapped arguments that may be passed directly to the job or script and utilized by name. Key-mapped arguments may be identified and parsed by the MapReduce job by their name, unlike positional arguments which may be identified and parsed by the position at which they were passed into the job. For example, the output of a MapReduce job may be a "param" expressed, for example, in the above schema.

"Configs" may be defined according the following schema:

```
{
    "name": "Mapper Count",
    "mapping": {
        "type": "configs",
        "location": "mapred.map.tasks"
    },
    ...
}
```

"Configs" may be key-mapped arguments identified by their name. In some embodiments, configs may not be passed directly to the job, as is the case with "params," but rather passed to the engine intended to run the MapReduce job. Configuration values, operated on by MapReduce job engines (such as Oozie or Hadoop), may be of the type "config." In one embodiment, configuration values are parameters that affect the hardware or other such configurations of the cluster intended to execute the MapReduce job.

First GUI 104 of computing device 102 may receive the job identifier and arguments. A user (e.g., a job developer) may use first GUI 104 to input the job identifier and arguments. In various embodiments, the job identifier and interface arguments are sent by first GUI 104 to MapReduce interface manager 112, where they are received. MapReduce interface manager 112 may receive the job identifier and/or job interface arguments directly from first computing device 102, without use of the first GUI 104. In other embodiments, MapReduce interface manager 112 receives the job ID and/or job interface arguments directly from MapReduce controller 110.

The provided first GUI may allow for a selection of first argument values corresponding to a first portion of the arguments. The first GUI displays the arguments associated with the job named by the job ID. The first GUI may allow for the selection of an argument value for each of the arguments. The GUI may also allow for the input of other information related to a MapReduce job. For example, the GUI may allow a selection of the job argument name, description, mapping type (e.g., args, params, or configs), location, value type, and/or whether the argument value is required to be entered before the job is executed. It should be noted that if an argument value is designated as "required," the value may be entered either at block 204 by a first user (e.g., a job developer), or at block 208 by a second user (e.g., a cluster operator). In some embodiments, the indication of an argument value being "required" may indicate that the corresponding argument is associated with a configuration of the cluster.

In another embodiment, the first GUI allows for the selection of an input data source, output data source, and mapper count associated with the MapReduce job to be executed. The input data source may be a file path that indicates the location of an input data file. In one embodiment, the output data source is a file path that indicates the location where the output of a MapReduce task should be saved. In one embodiment, the mapper count is a cluster specific value that reflects total number of mappers per MapReduce task. For example, a mapper count of 10 may indicate that 10 nodes (e.g., data nodes 120, 122, 124 of FIG. 1) in a particular cluster (e.g., cluster 118 of FIG. 1), or spread across several clusters, should be allocated to the "mapping phase" of the associated MapReduce job. In one embodiment, at least one of the argument values associated with at least one of the arguments specifies an order of the job interface arguments during execution of the MapReduce job.

First GUI 104 may perform validation operations to make job-related determinations. In one embodiment, first GUI 104 may determine if all argument names are unique so that argument mapping remains one-to-one throughout the execution of the job. GUI 104 may also determine that the mapping type and mapping location are unique, and/or the set of all positional arguments' locations are an unbroken integer sequence with an inclusive minimum of 0 to avoid potential gaps in the positional argument sequence. Positional arguments may not be required, but may be given default values if they are not selected. The job engine may not support the "mapping type" of an argument. In the case where a job engine does not support a selected mapping type, the validations performed by GUI 104 may flag this rejection by notifying the user and not allowing user to continue before selecting a different mapping type.

At block 206, processing logic may receive, from the first GUI, the first argument values for the first portion of the arguments and a selection of a second portion of the arguments that are associated with a configuration of the cluster and that are not provided with a corresponding argument value. In some embodiments, at least one of the first argument values may specify an order integer to ensure that the provided order can be persevered through any internal transformation. The first GUI may assign an order to the arguments, where the order corresponds to the order in which the arguments were input into the GUI by a job developer. When an API is used without a GUI, order may be preserved according the order in which the arguments are listed within a list object (e.g., a JSON list object). Furthermore, an indication (e.g., the selection of the second portion of the arguments) that one or more argument values are "required" and were not previously selected (e.g., were not provided with an argument value in the first GUI). In one embodiment, the first argument values are sent by first GUI 104 and received by MapReduce interface manager 112. In one embodiment, the first argument values and corresponding job ID are received by MapReduce interface manager 112. Alternatively, the input data source, output data source, and mapper count associated with the MapReduce job to be executed are also received by processing logic at block 206.

At block 208 processing logic provides a second GUI that is to display the arguments, the first argument values that were provided for the first portion of the arguments by the first GUI, and allows for a selection of second argument values for the second portion of the arguments. In one embodiment, the second GUI is second GUI 108 on second computing device 106. MapReduce interface manager 112 may provide the second GUI (e.g., second GUI 108) to second computing device 106. Alternatively, MapReduce interface manager 112 may provide the second GUI to the same computing device on which MapReduce interface manager 112 resides (e.g., MapReduce controller 110).

In one embodiment, the second GUI displays the job interface arguments that were also displayed by the first GUI at block 204. The second GUI may additionally display the argument values, corresponding to the job interface arguments, which were received at block 206. The second GUI may allow for the selection of second set of argument values. The second set of argument values may correspond to job interface arguments that did not already have corresponding argument values selected in the first GUI at block 204. In another embodiment, the second set of argument values may display the first set of argument values already selected for corresponding job interface arguments at block 204.

At block 210 the processing logic may execute the MapReduce job in view of the first argument values from the first GUI and the second argument values from the second GUI and in response to a selection from the second GUI. Processing logic may execute the MapReduce job in response to an action requesting the execution on second GUI 108. In one embodiment, MapReduce interface manager 112 of MapReduce controller 110 creates a job payload in view of the job ID, job interface arguments, first and second argument values and order of argument values.

MapReduce interface manger 112 may send the job payload to a job engine to execute the job.

In one embodiment, a user may be able to select other information corresponding to an argument. For example, the user may be able to define the argument name, description, mapping type (e.g., args, params, or configs), location, value type, and/or whether the argument value is required to be entered before the job is executed. A value type may be a string, number, data source, input data source, or output data source. When a user defines the argument value to be required and the argument value is not selected by the user of the first GUI 104, the argument value may need to be selected in the second GUI 108 before the job can be executed. Further, arguments may be stored in a database (e.g., in data storage 114) with an "order" integer to ensure that the provided order can be preserved through any internal transformation.

Figure 3:
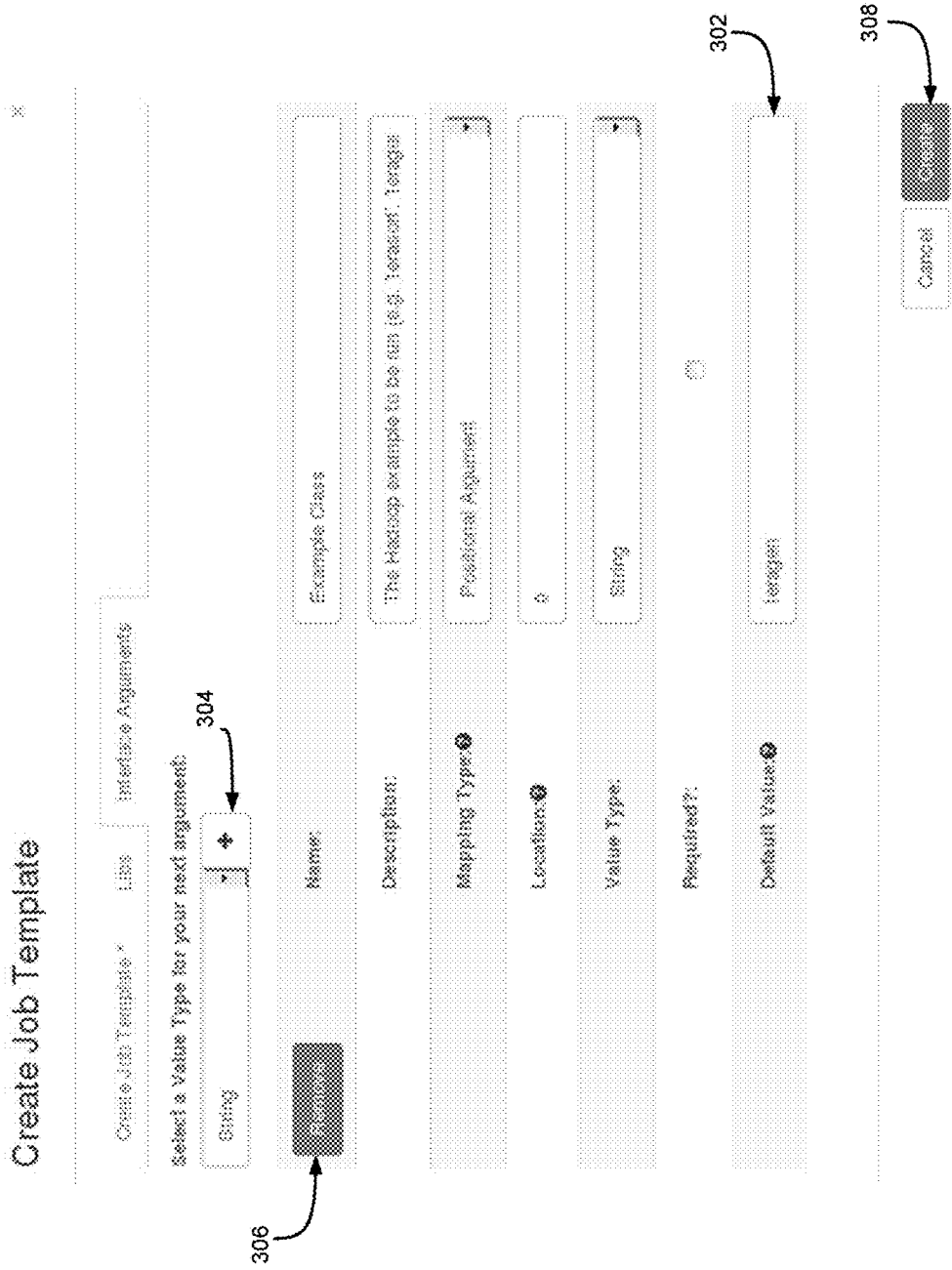
FIG. 3 illustrates a block diagram of one implementation of a first graphical user interface, according to an implementation of the disclosure.

FIG. 3 illustrates a block diagram of one implementation of a first graphical user interface. In one embodiment, GUI 300 is one example of first GUI 104 provided to a first computing device 102 of FIG. 1. GUI 300 may be provided by MapReduce interface manager 112 of MapReduce controller 110. In various embodiments, GUI 300 is provided to a user of first computing device 102 in response to the user indicating a desire to execute a MapReduce job. The user may be a MapReduce job developer.

In one embodiment, the GUI represented, for example, by GUI 300 includes an area 302 that allows for the selection of an argument value, corresponding to a job interface argument. In other embodiments, areas that allow for the selection of a name, description, mapping type, location, value type, and a required selector associated with a job interface argument are included. Furthermore, areas that allow for selection of an input data source, output data source, and/or mapper count may be included.

The GUI 300 may include an "add" button 304, which when activated, allows for the addition of arguments to a MapReduce job. A "remove" button 306 may also be included to allow for a user to remove an argument that was previously added.

Furthermore, the GUI 300 may include a "create" button 308, which when activated creates a job payload in view of the arguments and corresponding argument values. The job payload is transmitted to a job payload engine. The job payload may be received by MapReduce interface manager 112 of FIG. 1. Alternatively, MapReduce interface manager 112 creates the job payload and sends it to a separate job payload engine when the "create" button 308 is activated.

In one embodiment, the API embodied by GUI 300 can be integrated into any mechanism for the storage of MapReduce jobs (e.g., first computing device 102) and may be represented by the following JavaScript Object Notation (JSON) schema:

```
"interface": {
    "type": "array",
    "uniqueItems": True,
    "items": {
        "type": "object",
        "properties": {
            "name": {
                "type": "string",
                "minLength": 1
            },
            "description": {
                "type": "string"
            },
```

```
            "mapping": {
                "type": "object",
                "properties": {
                    "type": {
                        "type": "string",
                        "enum": ["args", "configs", "params"]
                    },
                    "location": {
                        "type": "string",
                        "minLength": 1
                    }
                },
                "additionalProperties": False,
                "required": [
                    "type",
                    "location"
                ]
            },
            "value_type": {
                "type": "string",
                "enum": [
                    "string",
                    "number",
                    "data_source",
                    "input_data_source",
                    "output_data_source"
                ],
                "default": "string"
            },
            "required": {
                "type": "boolean"
            },
            "default": {
                "type": "string"
            }
        },
        "additionalProperties": False,
        "required": [
            "name",
            "mapping",
            "required"
        ]
    }
}
```

In one embodiment, the above schema represents a GUI to select a MapReduce argument and associated argument values. For example, the above schema allows for a "name," "description," mapping," "value type," "required," and "default" selections. With each section, there may be section options. For example, under the "value type" section, the API represented by GUI 300 may include "string," "number," "data source," input data source," and "output data source," to indicate to a user of the GUI available selections for the associated section. These selections may correspond to the available selections shown in GUI 300, as described above.

Figure 4:
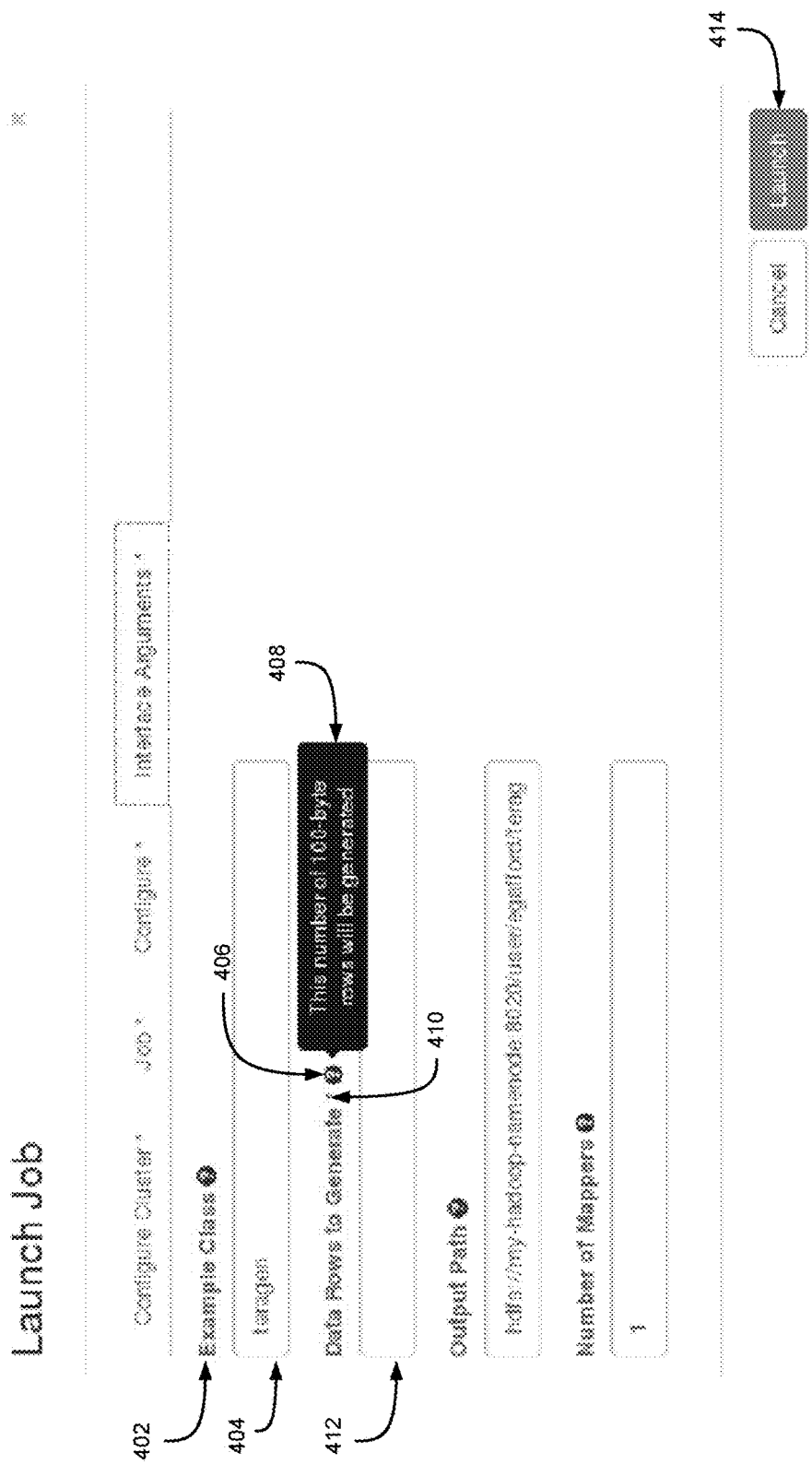
FIG. 4 illustrates a block diagram of one implementation of a second graphical user interface, according to an implementation of the disclosure.

FIG. 4 illustrates a block diagram of one implementation of a second graphical user interface. GUI 400 may be one example of second GUI 108 provided to a second computing device 106 of FIG. 1. In one embodiment, GUI 400 is provided by MapReduce interface manager 112 of MapReduce controller 110. In various embodiments, GUI 400 is provided to a user of second computing device 106 in response to the user indicating a desire to execute a MapReduce job. In one example, the user is a cluster operator.

The GUI 400 may include the name of an argument 402 and an area 404 for the argument value corresponding to the argument. In one embodiment, GUI 400 displays the plurality of arguments and the first argument values (e.g., for a first portion of the arguments) that were previously input into first GUI 300. GUI 400 may further allow a user (e.g., cluster operator) to select second argument values corresponding to a second portion of the arguments associated with the job ID of the MapReduce job to be executed. The second argument values selected at GUI 400 may correspond to arguments that do not already have existing first argument values. For example, if a user at GUI 300 does not select an argument value corresponding to an argument, a user at GUI 400 may select an argument value corresponding to the argument. In various other embodiments, GUI 400 provides operations that allow a cluster operator to overwrite an existing first argument value with a second argument value for a corresponding argument.

In one embodiment, when an argument value has been selected for an argument (e.g., in the first GUI represented by GUI 300), area 404 displays the selected value. Alternatively, when the argument value is not currently selected, the argument value area may be blank, as shown at 412. In one embodiment, when an argument value is selected prior to being displayed in the GUI 400, a user of the GUI may not edit the argument value. Alternatively, the user may overwrite the existing argument value with a new argument value. More than one argument and corresponding argument value may be shown. For example, arguments shown may include "Example Class," "Data Rows to Generate," "Output Path," and "Number of Mappers," with associated areas to select corresponding argument values.

In one embodiment, the GUI represented, for example, by GUI 400 includes a "description" indicator 406. In one embodiment, the description indicator 406 is represented by a question mark, as shown. Activating the description indicator 406 may cause a description 408 of the corresponding job interface argument to be shown. The description 408 may be provided in the GUI represented by GUI 300 of FIG. 3. In one embodiment, description indicator 406 is activated by hovering over it. Clicking on the indicator may additionally or alternately activate the button.

In one embodiment, the GUI 400 includes a "required" indicator 410. The indicator may be an asterisk, as shown. Indicator 410 may visually depict the requirement that a particular argument value should be selected or provided prior to executing the MapReduce job. A MapReduce job may not execute when the required indicator 410 is activated and the corresponding argument value has not been selected. In one embodiment, when required indicator 410 is activated and the associated argument value has not been selected, area 412 is empty and editable. The required indicator 410 may indicate an argument of the MapReduce job that corresponds to a configuration of the cluster.

The GUI 400 may include a "launch" button 414 that may allow for the execution of the MapReduce job associated with the GUI. In one embodiment, the MapReduce job is executed in view of the first argument values selected with respect to FIG. 300 and the second argument values selected with respect to FIG. 400.

Figure 5:
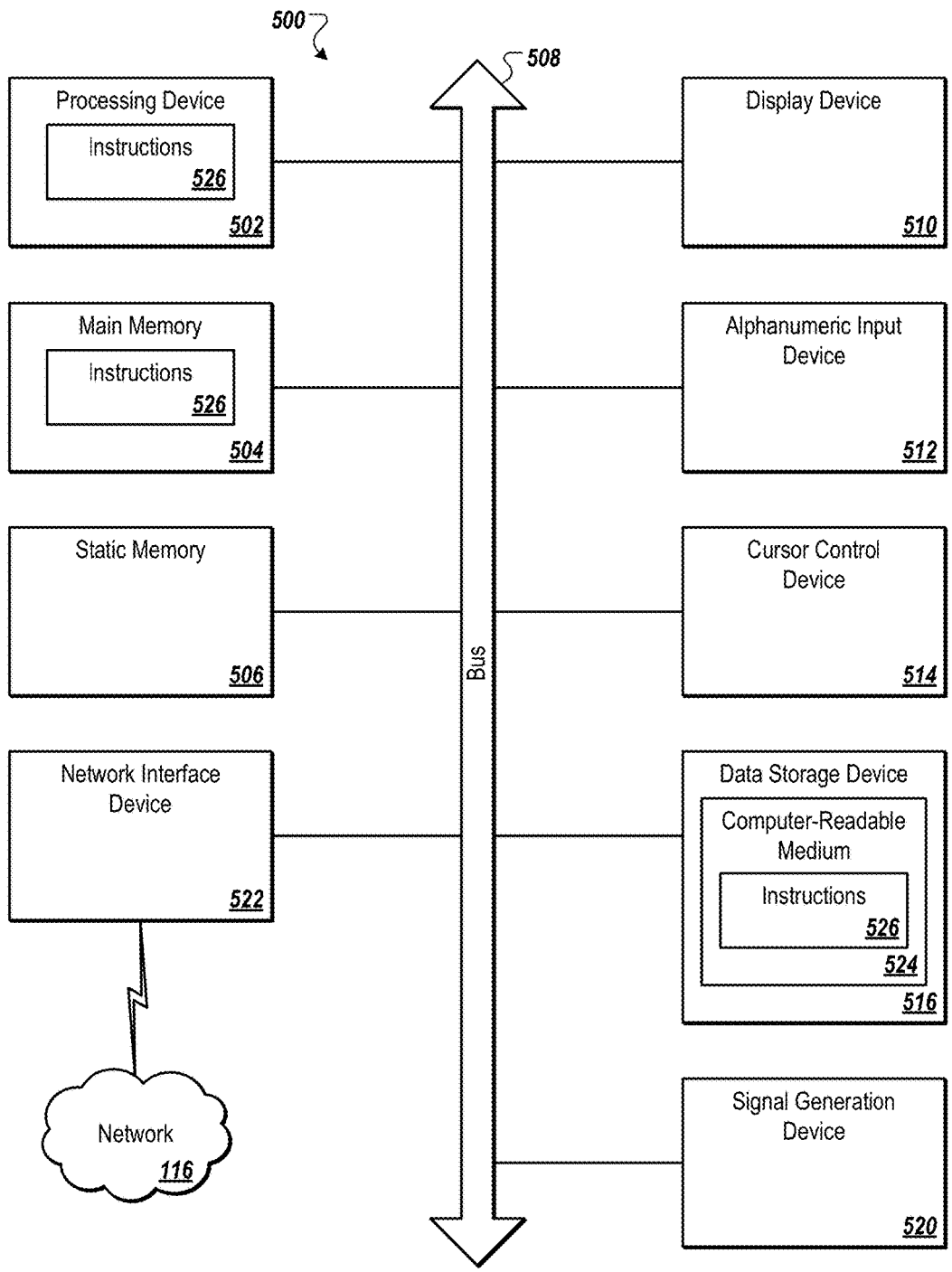
FIG. 5 illustrates a block diagram of one implementation of a computer system.

FIG. 5 illustrates a diagrammatic representation of a machine in the example form of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 500 includes a processing device 502 (e.g., processor, CPU, etc.), a main memory 504 (e.g., read-only memory (ROM), flash memory, dynamic random access memory (DRAM) (such as synchronous DRAM (SDRAM) or DRAM (RDRAM), etc.), a static memory 506 (e.g., flash memory, static random access memory (SRAM), etc.), and a data storage device 516, which communicate with each other via a bus 508.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the instructions 526 for performing the operations and steps discussed herein.

The computer system 500 may further include a network interface device 522 communicably coupled to a network 116. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a machine-readable storage medium 524 on which is stored software 526 embodying any one or more of the methodologies of functions described herein. The software 526 may also reside, completely or at least partially, within the main memory 504 as instructions 526 and/or within the processing device 502 as processing logic 526 during execution thereof by the computer system 500; the main memory 504 and the processing device 502 also constituting machine-readable storage media.

The machine-readable storage medium 524 may also be used to store instructions 526 to implement a MapReduce interface manager 112 to manage an API to define an interface for MapReduce jobs, such as MapReduce interface manager 112 described with respect to FIG. 1, and/or a software library containing methods that call the above applications. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing, encoding or carrying a set of instruction for execution by the machine and that cause the machine to perform any one or more of the methodologies of the disclosure. The term "machine-readable storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "providing," "executing," "transmitting," "creating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the purposes, or it may include a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method, comprising:
   receiving a request to submit, to a cluster of host systems, a MapReduce job;
   providing, by a processing device, a first graphical user interface (GUI) to a first computing device that allows for an input of a plurality of arguments for the MapReduce job and a selection of a plurality of first argument values for a first portion of the plurality of arguments, wherein at least one of the arguments in the first portion of the plurality of the arguments corresponds to an ordering of execution of the plurality of arguments associated with a sorting and filtering operation of the MapReduce job;
   receiving, via the first GUI at the first computing device, the selection of the plurality of first argument values for the first portion of the plurality of arguments and a selection of a second portion of the plurality of arguments that are associated with a configuration of the cluster of host systems and that are not provided with a corresponding argument value;
   providing, by the processing device, a second GUI to a second computing device that is to display the plurality of arguments, the plurality of first argument values, and allows for a selection of a plurality of second argument values for the second portion of the plurality of arguments that are associated with the configuration of the cluster of host systems; and
   in response to the selection of the plurality of second argument values via the second GUI at the second computing device, executing the MapReduce job in view of the plurality of first argument values and the plurality of second argument values, wherein the plurality of first argument values are passed to the MapReduce job and the plurality of second argument values are passed to a MapReduce job engine to facilitate execution of the MapReduce job.

2. The method of claim 1, wherein the first portion of the plurality of arguments comprises arguments that are used by a filtering and sorting operation of the MapReduce job on data across the host systems of the cluster of host systems.

3. The method of claim 1, wherein the plurality of arguments comprises at least one of: positional arguments passed as an array without a key, key-mapped arguments passed to the MapReduce job and utilized by name, or key-mapped arguments passed to the MapReduce job engine.

4. The method of claim 1, wherein the second portion of the plurality of arguments are indicated as a requirement to be provided a corresponding argument value in the second GUI, the method further comprising:
   in response to a selection to execute the MapReduce job, determining that the corresponding argument value has been provided in the second GUI, wherein the executing of the MapReduce job is further in view of the determination that the corresponding argument value has been provided.

5. The method of claim 1, further comprising:
   receiving, from the first GUI, a description associated with at least one of the arguments; and
   in response to an activation of a description indicator in the second GUI, providing the description of the at least one of the arguments, the description to be displayed in the second GUI.

6. The method claim 1, wherein the second portion of the plurality of arguments that are associated with the configuration of the cluster of host systems comprises an output data source that specifies a location in the cluster of host systems to store results of the MapReduce job, and a mapper count that determines a number of nodes of the cluster of host systems that are allocated to the execution of a mapping phase of the MapReduce job.

7. The method of claim 1, further comprising:
   receiving a selection of a first argument value from the plurality of first argument values from the second GUI; and
   in response to receiving the selection of the first argument value, overwriting the first argument value with a second argument value from the plurality of second argument values, wherein the second argument value corresponds to the first argument value.

8. The method of claim 1, wherein the ordering of execution of the plurality of arguments is in view of order integers assigned to one or more corresponding arguments of the plurality of arguments.

9. An apparatus comprising:
   a memory; and
   a processing device operatively coupled with the memory, the processing device to:
      receive a request to submit, to a cluster of host systems, a MapReduce job;
      provide a first graphical user interface (GUI) to a first computing device that allows for an input of a plurality of arguments for the MapReduce job and a selection of a plurality of first argument values for a first portion of the plurality of arguments, wherein at least one of the arguments in the first portion of the plurality of arguments corresponds to an ordering of execution of the plurality of arguments associated with a sorting and filtering operation of the MapReduce job;
      receive, via the first GUI at the first computing device, the selection of the plurality of first argument values for the first portion of the plurality of arguments and a selection of a second portion of the plurality of arguments that are associated with a configuration of the cluster of host systems and that are not provided with a corresponding argument value;
      provide a second GUI to a second computing device that is to display the plurality of arguments, the plurality of first argument values, and allows for a selection of a plurality of second argument values for the second portion of the plurality of arguments that are associated with the configuration of the cluster of host systems; and in response to the selection of the plurality of second argument values via the second GUI associated with the second computing device, execute the MapReduce job in view of the plurality of first argument values and the plurality of second argument values, wherein the plurality of first argument values are passed to the MapReduce job and the plurality of second argument values are passed to a MapReduce job engine to facilitate execution of the MapReduce job.

10. The apparatus of claim 9, wherein the first portion of the plurality of arguments comprises arguments that are used by a filtering and sorting operation of the MapReduce job on data across the host systems of the cluster of host systems.

11. The apparatus of claim 9, wherein the plurality of arguments comprises at least one of: positional arguments passed as an array without a key, key-mapped arguments passed to the MapReduce job and utilized by name, or key-mapped arguments passed to the MapReduce job engine.

12. The apparatus of claim 9, wherein the second portion of the plurality of arguments are indicated as a requirement to be provided a corresponding argument value in the second GUI, the processing device further to:
  in response to a selection to execute the MapReduce job, determine that the corresponding argument value has been provided in the second GUI, wherein the executing of the MapReduce job is further in view of the determination that the corresponding argument value has been provided.

13. The apparatus of claim 9, the processing device further to:
  receive, from the first GUI, a description associated with at least one of the arguments; and
  in response to an activation of a description indicator in the second GUI, provide the description of the at least one of the arguments, the description to be displayed in the second GUI.

14. The apparatus of claim 9, wherein the second portion of the plurality of arguments that are associated with the configuration of the cluster of host systems comprises an output data source that specifies a location in the cluster of host systems to store results of the MapReduce job, and a mapper count that determines a number of nodes of the cluster of host systems that are allocated to the execution of a mapping phase of the MapReduce job.

15. A non-transitory computer-readable medium having instructions stored thereon that, when executed by a processing device, causes the processing device to:
  receive a request to submit, to a cluster of host systems, a MapReduce job;
  provide, by the processing device, a first graphical user interface (GUI) to a first computing device that allows for an input of a plurality of arguments for the MapReduce job and a selection of a plurality of first argument values for a first portion of the plurality of arguments, wherein at least one of the arguments in the first portion of the plurality of arguments corresponds to an ordering of execution of the plurality of arguments associated with a sorting and filtering operation of the MapReduce job;
  receive, via the first GUI at the first computing device, the selection of the plurality of first argument values for the first portion of the plurality of arguments and a selection of a second portion of the plurality of arguments that are associated with a configuration of the cluster of host systems and that are not provided with a corresponding argument value;
  provide, by the processing device to a second computing device, a second GUI that is to display the plurality of arguments, the plurality of first argument values, and allows for a selection of a plurality of second argument values for the second portion of the plurality of arguments that are associated with the configuration of the cluster of host systems; and
  in response to the selection of the plurality of second arguent values via the second GUI at the second computing device, execute the MapReduce job in view of the plurality of first argument values and the plurality of second argument values, wherein the plurality of first argument values are passed to the MapReduce job and the plurality of second argument values are passed to a MapReduce job engine to facilitate execution of the MapReduce job.

16. The non-transitory computer-readable medium of claim 15, wherein the first portion of the plurality of arguments comprises arguments that are used by a filtering and sorting operation of the MapReduce job on data across the host systems of the cluster of host systems.

17. The non-transitory computer-readable medium of claim 15, wherein the plurality of arguments comprises at least one of: positional arguments passed as an array without a key, key-mapped arguments passed to the MapReduce job and utilized by name, or key-mapped arguments passed to the MapReduce job engine.

18. The non-transitory computer-readable medium of claim 15, wherein the second portion of the plurality of arguments are indicated as a requirement to be provided a corresponding argument value in the second GUI, the processing device further to:
  in response to a selection to execute the MapReduce job, determine that the corresponding argument value has been provided in the second GUI, wherein the executing of the MapReduce job is further in view of the determination that the corresponding argument value has been provided.

19. The non-transitory computer-readable medium of claim 15, wherein the second portion of the plurality of arguments that are associated with the configuration of the cluster of host systems comprises an output data source that specifies a location in the cluster of host systems to store results of the MapReduce job, and a mapper count that determines a number of nodes of the cluster of host systems that are allocated to the execution of a mapping phase of the MapReduce job.

* * * * *

UNITED STATES PATENT AND TRADEMARK OFFICE
CERTIFICATE OF CORRECTION

PATENT NO. : 10,592,287 B2  
APPLICATION NO. : 14/947135  
DATED : March 17, 2020  
INVENTOR(S) : Ethan Gafford Page 1 of 1

It is certified that error appears in the above-identified patent and that said Letters Patent is hereby corrected as shown below:

In the Claims

In Claim 15, Column 16, Line 19:
"arguent"
Should be:
"argument"

Signed and Sealed this
Nineteenth Day of May, 2020

Andrei Iancu
*Director of the United States Patent and Trademark Office*